Sept. 25, 1962 W. M. MAY 3,055,699
TRUCK CAB CONSTRUCTION
Filed Feb. 2, 1960 3 Sheets-Sheet 1

INVENTOR
WALTER M. MAY
BY
HIS ATTORNEYS

Sept. 25, 1962　　　　W. M. MAY　　　　3,055,699
TRUCK CAB CONSTRUCTION
Filed Feb. 2, 1960　　　　　　　　　　　　　　　3 Sheets-Sheet 2

INVENTOR
WALTER M. MAY
BY
HIS ATTORNEYS

Sept. 25, 1962   W. M. MAY   3,055,699
TRUCK CAB CONSTRUCTION

Filed Feb. 2, 1960   3 Sheets-Sheet 3

INVENTOR
WALTER M. MAY
BY
HIS ATTORNEYS

United States Patent Office 3,055,699
Patented Sept. 25, 1962

3,055,699
TRUCK CAB CONSTRUCTION
Walter M. May, Allentown, Pa., assignor to Mack Trucks, Inc., Plainfield, N.J., a corporation of New York
Filed Feb. 2, 1960, Ser. No. 6,154
5 Claims. (Cl. 296—28)

This invention relates to improvements in bodies for vehicles and it relates particularly to an improved type of cab for cab-over-engine or tilting-cab trucks.

In trucks in which the engine is disposed underneath the cab, it is common to provide a centrally located tunnel in the floor of the cab which serves as a hood for the engine. The hood is usually completely or partially removable and inasmuch as it is merely a cover for the engine, it adds little, if any, structural strength to the cab. In some cab-over-engine vehicles, the cab may be mounted for movement relative to the vehicle frame and is not reinforced by the vehicle frame. In order to prevent racking and twisting of such movable cabs and to render them self-supporting, it is common to provide relatively stiff and heavy sill members on which the floor and the door frames, and other framing for the cab are mounted.

In accordance with the present invention, a unitary cab construction is provided in which the tunnel for covering the engine serves as the principal reinforcing element and support for the floor and other parts of the cab structure thereby doing away with the need for heavy floor sill members.

More particularly, in accordance with the present invention, the tunnel is formed of stiff metal, such as aluminum of substantial thickness, and carries on its opposite sides floor panels having door frames united with their lateral edges and with transverse beams at the forward and rear edges of the tunnel. The front and rear transverse beams serve as outriggers for suspending the door frames and the floor panels from the tunnel and, with it, form a strong, rigid frame for the cab. Other framing members may be assembled on the floor and joined to the elements described above and the cab may then be completed by welding, riveting or otherwise securing panels, formed for example of aluminum, fiber glass or the like to the framing. As a result, a very strong, rigid and lightweight cab construction is provided which is capable of withstanding the racking and twisting forces to which it is subjected in use and when it is tilted or otherwise moved to uncover the truck engine.

For a better understanding of the present invention reference may be had to the accompanying drawing in which.

Figure 1:
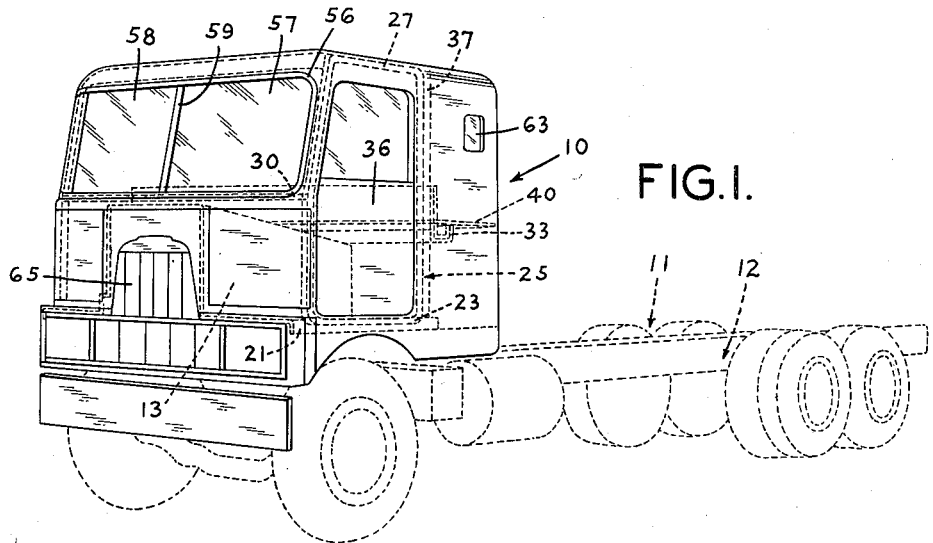
FIGURE 1 is a perspective view of a typical cab embodying the present invention and showing, in dotted lines, a typical truck chassis with which the cab is used.

The cab 10 in the embodiment shown in FIGURES 1 to 4 is mounted on the truck 11 for pivoting movement around its front end relative to the frame 12 of the truck to give access to the engine (not shown) which is mounted in the frame below the cab and is partially housed within a tunnel 13 in the cab floor 14. It will be understood, of course, that the cab may be fixed relative to the frame or mounted for horizontal sliding movement, for vertical movement or for tilting laterally or rearwardly as desired to uncover the engine.

In accordance with the present invention, the tunnel 13, and particularly the side panels 13a and 13b thereof, is the principal reinforcing and supporting element of the new cab.

The floor 14 of the cab includes two relatively flat panels 15 and 16 disposed on opposite sides of the tunnel 13 which, as shown, has generally rectangular rearwardly inclined top surface 17, and a stepped portion 18 in the panel 13b to accommodate operating components of the vehicle. The floor 14 including the tunnel 13 may be formed of a single piece of relatively heavy gauge material, such as aluminum, so that it is essentially rigid. If desired, the floor and tunnel may be made up of several pieces of sheet metal welded or otherwise secured together to produce a unitary structure. Thinner sheet metal can be used in the panels 15 and 16 than the sides of the tunnel 13. An opening 19 is formed in the top of the tunnel through which extend the gear shift and parking brake levers (not shown) or other elements required in the operation of the vehicle.

Figure 2:
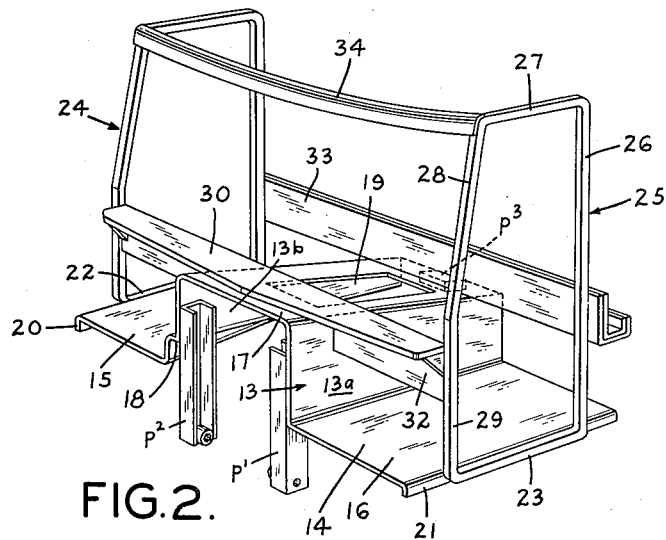
FIGURE 2 is a perspective view of a partial assembly of the cab including the basic reinforcing elements thereof.

As shown in FIGURE 2, the outer lateral edges of the floor 14 are provided with downwardly extending flanges 20 and 21 to which are welded or otherwise secured the bottom sill edges 22 and 23 of the door frames 24 and 25. The door frames may be of any desired shape but, as illustrated, each has a substantially vertically disposed straight rear edge 26, a top sill 27 parallel with the lower sill 23, a forwardly and downwardly inclined portion 28 and a substantially vertical portion 29. The cab doors will, of course, be shaped to conform to the frames and may be suitably hinged to the frames.

Figure 3:
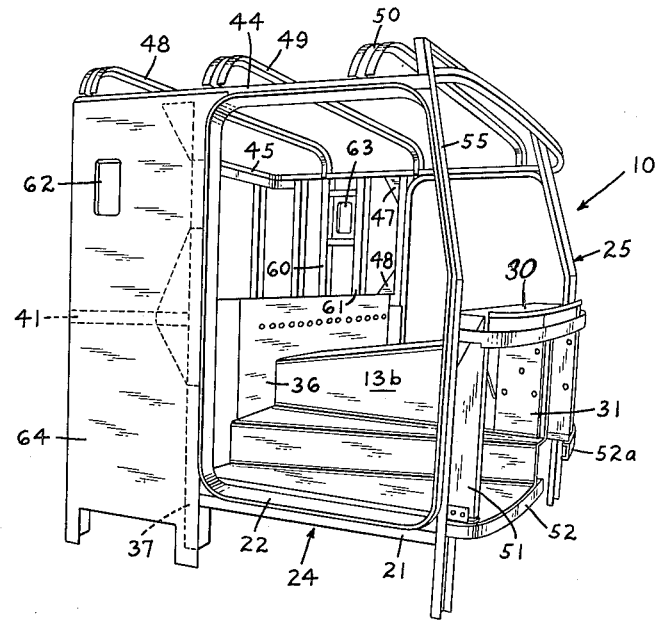
FIGURE 3 is a perspective view of the cab looking from the opposite side and showing the cab with a part of the side panelling applied to the framing thereof.

A transverse beam 30 of angle cross-section is secured to the forward portion of the tunnel 13 and has its opposite ends secured to the vertical front portions of the door frames 24 and 25. The front beam also forms a part of the cowl for the cab and is the principal reinforcing and supporting element for the windshield and the instrument panel of the vehicle. As shown in FIGURE 3, the beam 30 is secured to the front of the tunnel by means of angular gussets 31 riveted or otherwise secured to the sides of the tunnel and to the vertical flange 32 of the beam 30 at each side of the tunnel.

Extending transversely at the rear of the tunnel is another beam 33 of generally L-shaped cross-section which is secured to the top rear portion of the tunnel 13 and at its opposite ends either directly or through another structural member to the rear uprights of the door frames 24 and 25. Also, the top front corners of the door frames 24 and 25 are connected by a headpiece 34 of angle or channel cross-section which further reinforces the door assembly.

As shown in FIGURE 2, the side panels 13a and 13b of the tunnel carry the pivot supports $P^1$ and $P^2$ by means of which the cab is pivotally mounted in the truck frame 12. Also at the rear of the tunnel 13 is a supporting block $P^3$ which engages a support (not shown) on the truck frame. The cab thus is supported at three points on the frame. The other portions of the cab outboard of the tunnel 13 are not supported by the frame. The beams 30, 33 and their connections with the door frames 24 and 25 form outrigger supports for the floor panels 15 and 16. In other words, the tunnel 13 forms a backbone on which all of the other elements of the cab are supported. The side panels 13a and 13b are the principal supporting elements of the tunnel 13.

Figure 4:
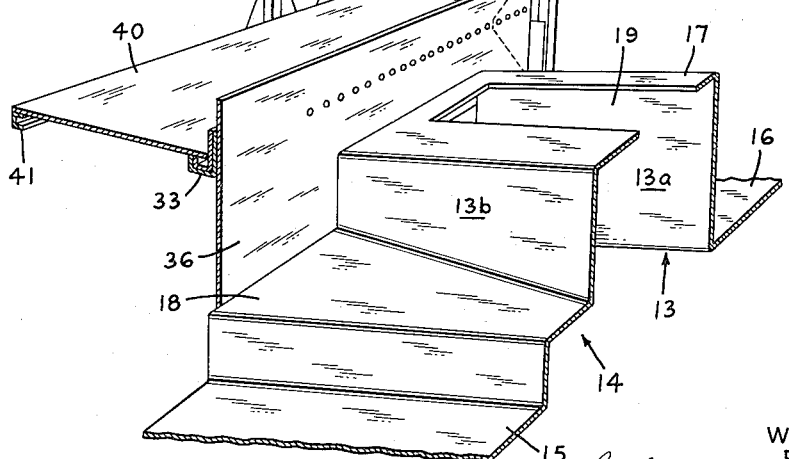
FIGURE 4 is a perspective view of a portion of the interior of the cab illustrating details thereof.

In some trucks, a sleeping compartment is provided for one of the drivers of the vehicle. To that end, and as shown in FIGURES 1 and 4, a partition or bulkhead 36 is welded, riveted or otherwise secured to the floor 14, the front face of the beam 33 and to the uprights or frame members 37 (FIGURES 3 and 4) secured to the upright portions 26 of the door frames 24 and 25. As shown, the uprights 37 are interposed between the ends of the beam 33 and the door frames 24 and 25 and these elements are welded, riveted or otherwise formed to form a unitary structure. Appropriate reinforcements such as gusset plates 39 may be used where required.

Extending rearwardly from the partition or bulkhead 36 and carried by the horizontal flange of the beam 33 is a panel 40 which forms a support for a mattress or the like. The rear edge of the panel is supported on a channel member 41 which extends horizontally across the back and along the sides of the cab and is joined to the vertical frame members 42, 43 etc. which support the sheathing for the back of the cab and to the framing members 37. Also, the upper ends of the several framing members 37, 42, 43 etc. and the tops of the door frames 24 and 25 are joined by means of beams 44, 45 and 46 which extend around the upper perimeter of the cab body. Appropriate reinforcing elements, such as gusset plates 47, 48 may be used at points where the framing members engage the beams of the vehicle. The floor 14 may extend back to the frame members 42, 43 etc. or may terminate in front of them as shown in FIGURE 4. In the latter case a member similar to the member 41 will be used to connect and reinforce the lower ends of the frame members 42, 43 etc. and support the sheathing or skin of the cab.

Extending between the beams 44 and 46 are top bows 48, 49 and 50 which may also be formed of light metal of I-beam, channel cross-section or other suitable shape as shown in FIGURES 3 and 4.

Front corner reinforcing plates 51 (FIGURE 3) are interposed between and fixed to the floor 14 and the front beam 30 thereby further stiffening the assembly. A pair of reinforcing channel members 52, 52a extend across the front of the floor plate 14 on opposite sides of the tunnel 13 and add to the stiffness of the floor 14.

Vertical framing elements 55 are disposed in front of each of the door frames 24 and 25 and extend from the floor to the headpiece 34 and support for the windshield frame in which the weather seal 56, the windshield panels 57 and 58 and the windshield divider strip 59 are mounted. It will be understood that other short framing elements 60 and 61 may be mounted in the opposite sides of the cab for supporting ventilators or windows 62 and 63 in the sleeping compartment of the cab.

The above described cab frame is provided with an appropriate sheathing 64 which covers the sides and the top of the cab and extends partially across the front of the cab to outline the area in which the radiator grill 65 of the vehicle is mounted. The sheathing may be sheet material, such as sheet metal, fibre glass or the like which is welded, riveted or otherwise secured to the framing elements. In addition, it will be understood that the inside of the cab may be panelled with metal, plastics, wood, or the like, and the cab may be insulated and provided with a rear view window (not shown).

The new cab structure is essentially unitary. The tunnel 13 serves as the backbone of the cab and together with the remainder of the floor and the cross beams 30 and 33 and the framing and reinforcing elements connected thereto provides a rigid structure capable of withstanding the forces to which the cab would be subjected in its normal usage.

Figure 5:
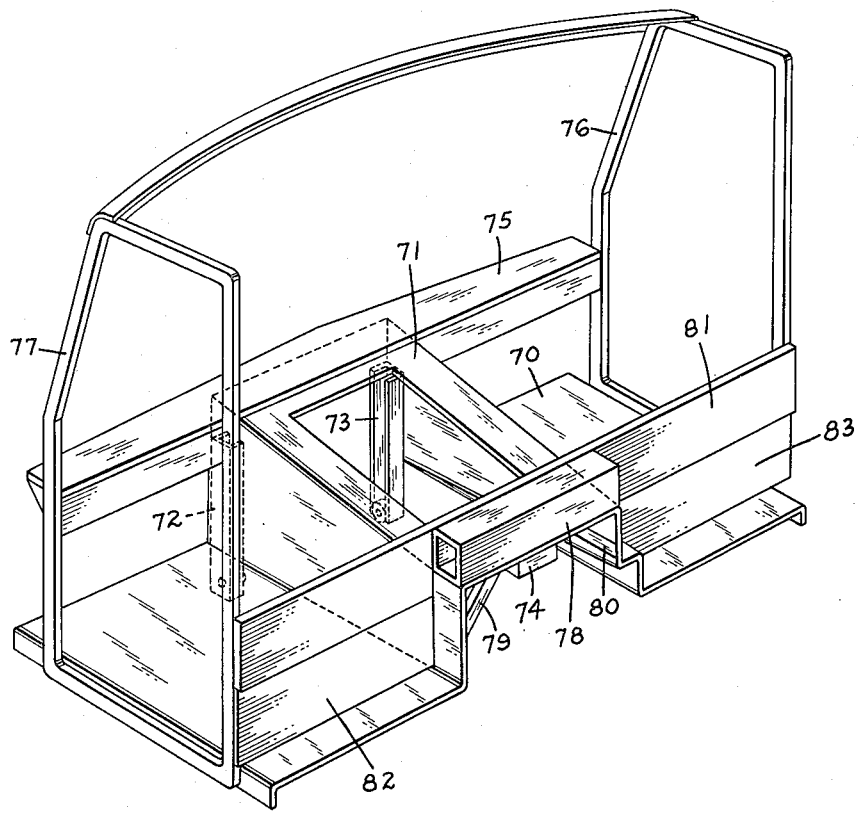
FIGURE 5 is a perspective view of the basic reinforcing elements of a modified form of cab viewed from the rear thereof.

FIGURE 5 illustrates another modification of the reinforcing structure of the cab. It includes a floor 70 including a tunnel 71 for covering the vehicle engine. The side panels of the tunnel 71 carry the forward pivot supports 72 and 73 for the cab, while the third rear support 74 is affixed to the rear end of the tunnel at about its center. This form of cab also includes a front, transverse beam 75 having its mid-portion secured to the top and the side panels of the tunnel 71 and its opposite ends joined to the front portions of the door frames 76 and 77. A short beam member 78 of box section is secured to and extends across the rear end of the top panel of the tunnel and serves to carry the stresses exerted on the support 74 to the side panels of the tunnel 71. For better distribution of these stresses and transfer of them to the side panels, angle members 79 and 80 are welded to the top of the tunnel and beam 78 and to the side panels of the tunnel.

In this form of cab construction, the rear edges of the door frames 76 and 77 are connected to the tunnel by means of a beam formed of a plate or bar 81 of relatively thick metal which is welded or otherwise secured to the beam 78 and to the top and sides of the tunnel. The space between the lower edge of the plate 81 and the floor 70 may be closed by means of filler plates or sheets 82 and 83 of thin sheet material such as sheet metal or fiber glass.

With the arrangement described, the rigid tunnel and the beams extending laterally from the tunnel support the door frames and the floor portions on opposite sides of the tunnel as well as the framing panelling and other elements of the cab.

The basic cab structure shown in FIGURE 5 can be completed by means of framing members and panelling as described above. It may be provided with a sleeping compartment as disclosed in FIGURES 1 to 4, or the sleeping compartment can be omitted and the framing and the panelling can be constructed around and united with the perimeter of the floor 70.

It will be understood that the cab is susceptible to considerable modification in its overall appearance, size and the like and that the shape and the size of the windshield, the arrangement and ornamentation of the radiator grill and the like are susceptible to wide variation. Accordingly, the form of the invention described herein should be considered as illustrative.

I claim:

1. A cab for a motor vehicle having a frame comprising a floor plate having front, rear and side edges and a substantially centrally located substantially rigid tunnel extending upwardly from and lengthwise of said floor plate between its front and rear edges, said plate having floor portions lower than and on opposite sides of said tunnel, door frames secured to the side edges of said floor plate, and transverse beams united with the tops of the front and rear ends of said tunnel and extending between and secured to said door frames in vertically spaced relation to said floor portions and supporting the door frames and said floor portions outboard of said tunnel and means at the front and rear ends of said tunnel for supporting said plate on said frame.

2. A cab for a motor vehicle comprising a floor plate having front, rear and side edges and a substantially centrally located tunnel integral with and projecting above said floor plate and extending from its front edge to its rear edge, said plate having floor portions lower than and on opposite sides of said tunnel, door frames united at their lower ends to said side edges of said plate, a transverse beam united with the top of the front end of said tunnel and extending between and secured to the front of the door frames above and in spaced relation to said floor portions and a second beam secured to the top of the rear end of said tunnel and extending between and secured to the rear of said door frames above and in spaced relation to said floor portions.

3. The cab set forth in claim 2 comprising a platform having a front edge joined to said second beam, and substantially coextensive in length with the width of said floor plate, said platform extending rearwardly from said second beam, framing members united with said floor plate, with said beams and with said platform, and sheathing secured to said framing members, to said floor plate and to said beams to form a cab enclosure.

4. A cab for a motor vehicle comprising a floor plate having front, rear and opposite sides edges, and a substantially centrally located tunnel integral with and projecting upwardly from said floor plate and extending from its front to its rear edge, said plate having floor portions lower than and on opposite sides of said tunnel, a first unitary beam having its mid-portion united with the front end of said tunnel adjacent to the top thereof and extending transversely with relation to said floor plate with the ends of said beam spaced vertically from said floor portions, a second beam having its mid-portion united with the rear end of the tunnel and extending transversely with relation to said floor plate with the ends of said beam adjacent to but spaced vertically from the said floor portions, door frames having lower edges united with opposite side edges of said floor plate and and front and rear vertical edges secured to said ends of said first and second beams, respectively, and means at the front and rear ends of said tunnel for supporting said floor plate on said vehicle.

5. The cab set forth in claim 4 comprising peripheral framing members extending upwardly from said side edges of said floor plates and opposite ends of said first beam, and other framing members joining the upper ends of said peripheral framing members.

References Cited in the file of this patent

UNITED STATES PATENTS

| | | |
|---|---|---|
| 2,064,100 | Bachman | Dec. 15, 1936 |
| 2,485,794 | Waterbury et al. | Oct. 25, 1949 |
| 2,912,057 | Wagner | Nov. 10, 1959 |

FOREIGN PATENTS

| | | |
|---|---|---|
| 616,466 | Great Britain | Jan. 21, 1949 |
| 1,020,535 | Germany | Dec. 5, 1957 |
| S 32,559 | Germany | Sept. 1, 1955 |